United States Patent
Sesha et al.

(10) Patent No.: US 11,233,744 B2
(45) Date of Patent: Jan. 25, 2022

(54) REAL-TIME NETWORK APPLICATION VISIBILITY CLASSIFIER OF ENCRYPTED TRAFFIC BASED ON FEATURE ENGINEERING

(71) Applicant: Hewlett Packard Enterprise Development LP, Houston, TX (US)

(72) Inventors: Madhusoodhana Chari Sesha, Bangalore Karnataka (IN); Tamil Esai Somu, Bangalore Karnataka (IN); Srinidhi Hari Prasad, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/085,528

(22) Filed: Oct. 30, 2020

(65) Prior Publication Data
US 2021/0168083 A1    Jun. 3, 2021

(30) Foreign Application Priority Data
Nov. 28, 2019   (IN) .............................. 201941048925

(51) Int. Cl.
*H04L 12/851*   (2013.01)
*H04L 12/26*   (2006.01)

(52) U.S. Cl.
CPC ........ *H04L 47/2441* (2013.01); *H04L 43/026* (2013.01); *H04L 47/2408* (2013.01)

(58) Field of Classification Search
None
See application file for complete search history.

(56) References Cited

U.S. PATENT DOCUMENTS

2019/0042310 A1* 2/2019 Browne ................ G06F 1/3296

OTHER PUBLICATIONS

Caida, "Internet Traffic Classification", available online at <https://www.caida.org/research/traffic-analysis/classification-overview/>, Oct. 13, 2020, 5 pages.
Chari et al., "Network traffic classification by packet length signature extraction", IEEE, 2020, 4 pages.
Erman et al., "Semi-Supervised Network Traffic Classification", SIGMETRICS'07, ACM, Jun. 12-16, 2007, 2 pages.
(Continued)

*Primary Examiner* — Christine T Duong
(74) *Attorney, Agent, or Firm* — Sheppard Mullin Richter & Hampton LLP

(57) ABSTRACT

Systems and methods are provided for a light-weight model for traffic classification within a network fabric. A classification model is deployed onto an edge switch within a network fabric, the model enabling traffic classification using a set of statistical features derived from packet length information extracted from the IP header for a plurality of data packets within a received traffic flow. The statistical features comprise a number of unique packet lengths, a minimum packet length, a maximum packet length, a mean packet length, a standard deviation of the packet length, a maximum run length, a minimum run length, a mean run length, and a standard deviation of run length. Based on the calculated values for the statistical features, the edge switch determines a traffic class for the received traffic flow and tags the traffic flow with an indication of the determined traffic class.

20 Claims, 7 Drawing Sheets

(56) References Cited

OTHER PUBLICATIONS

Jiang et al., "Use Cases of Applying Machine Learning Mechanism with Network Traffic", EuCNC2016, Jun. 27, 14 pages.
Margaret Rouse, "What is OVSDB (Open vSwitch Database Management Protocol)?", available online at <https://searchnetworking.techtarget.com/definition/OVSDB-Open-vSwitch-Database-Management-Protocol>, Sep. 2013, 3 pages.
Parvat et al., "Traffic Classification Technique in Computer Networks", USER, vol. 3, No. 7, Jul. 2012, 9 pages.
Sflow, "Traffic Monitoring using sFlow®", Making the Network Visible, 2003, 5 Pages.
Wikipedia, "Feature engineering", available online at <https://en.wikipedia.org/wiki/Feature_engineering>, Dec. 6, 2020, 4 pages.

\* cited by examiner

REAL-TIME NETWORK APPLICATION VISIBILITY CLASSIFIER OF ENCRYPTED TRAFFIC BASED ON FEATURE ENGINEERING

DESCRIPTION OF RELATED ART

Encrypted Internet traffic classification is vital for network management and enables service providers to perform policy enforcement, optimize traffic, and ensuring a good user experience. With the emerging trend of "bring your own device" (BYOD) policies and the rapid increase in the number of applications provided to the end users, network entities (e.g., routers, switches, etc.) witness millions of flows every day. These flows exhibit different characteristics depending on the activity of the user. Classification of the data flows into different classes (e.g., real-time, bulk transfer, interactive, etc.) provides visibility, be it at the network level of at the individual network entity level (e.g., at the switch or router). Visibility refers to being aware of the traffic types moving within a network, enabling network administrators or automated processes to keep a constant eye on network traffic, monitored applications, network performance, and analytics. By having access to such information, network management and scalability are enabled in a more efficient manner.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
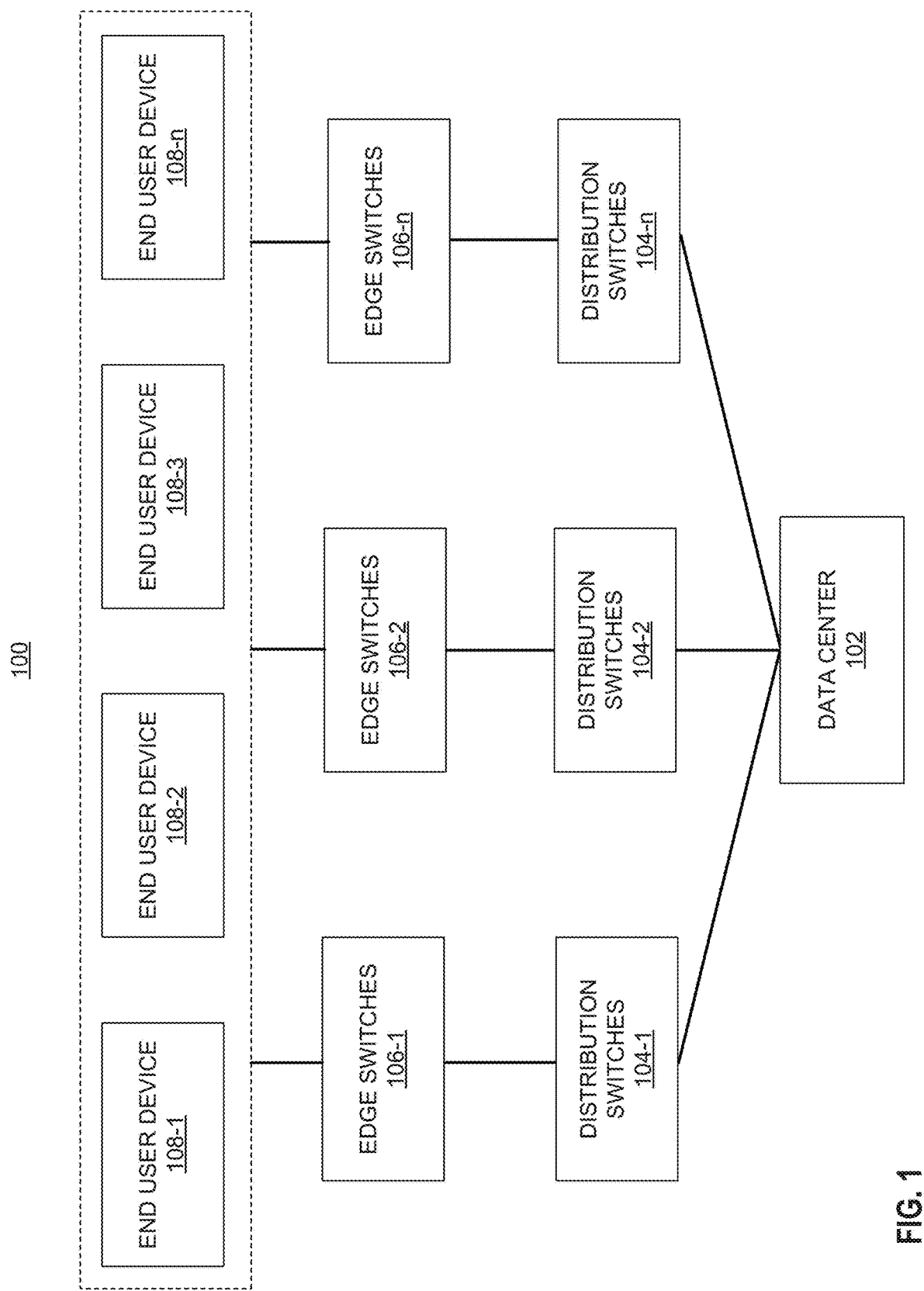
FIG. 1 is an example network fabric in which embodiments of the technology disclosed herein may be implemented.

The figures are not exhaustive and do not limit the present disclosure to the precise form disclosed.

DETAILED DESCRIPTION

Visibility provided through classification of flows helps in network monitoring, security enhancement, and providing preferential treatment for different classes of traffic. A flow is a unidirectional sequence of packets that have some field values in common. These common field values can include source IP address, destination IP address, source port, destination port, and IP protocol type (referred to as the "5-tuple"). Preferential treatment includes treating a flow with a priority by allocating appropriate buffers or bandwidth. The assigning of priority can be based on the quality of service (QoS) marking present in the data packets of a flow. However, the characteristics of a given flow may differ from the characteristics of the marked class type, or most of flow hitting the router may be marked as a default class.

Classifying the traffic at the router through continuous monitoring would help in effectively prioritizing the flows, but such real-time classification is resource intensive. Port-based classification using the official Internet Assigned Numbers Authority (IANA) list is one method of classifying traffic flows. However, the rise in the usage of dynamic port numbers has rendered such a classification approach obsolete. Another approach uses deep packet inspection (DPI) to search contents of the data packets of the flows themselves rather than solely looking at header information of the data packets. The increase in web traffic being encrypted has rendered DPI ineffective for the majority of traffic passing through a router or other network device.

One approach to overcome some of the issues presented due to increased usage of dynamic port assignment and traffic encryption is to use statistical features of data flows to classify the flows. Each flow is described using a set of features extracted from the flow, without the express need to inspect the packets in the flow. For example, one approach utilizes a Bayesian neural network to classify the flows based on a feature set of 246 features. Such a large feature set demands a large amount of computational resources in order to perform the classification. Moreover, many statistical feature approaches utilize features that are not consistent across different networks and implementations, such as time-variant features (e.g, inter-packet arrival time, session timeout, burst duration, and idle time, etc.) and volumetric statistics (e.g., flow size distribution, entropy, estimated cardinality, heavy hitter counts, etc.), among other statistics that may vary over time or configuration. Use of such features further reduce the overall accuracy of current statistical approaches. Although combining two or more different methods of statistical feature analysis may increase accuracy, the combination introduces its own complexity that hinders the ability to perform such classification in real-time. Alone or in combination, these types of statistical approaches generally are best implemented in the core of a given network, such as in a data center or other large-scale node in the network because edge devices, such as routers and switches, generally lack the computational resources required to perform the methods in an efficient manner. Performing classification on the cloud (i.e., at the core of the network) consumes additional bandwidth because many samples need to be sent to the cloud, making current approaches less suited for real-time classification.

FIG. 1 illustrates a network fabric 100 in which embodiments of the technology disclosed herein can be implemented. The network fabric 100 is provided for illustrative purposes only and should not be interpreted as limiting the scope of the technology only to the depicted network fabric topology. The technology disclosed herein is agnostic to the network topology implemented. A person of ordinary skill in the art would understand that the technology disclosed herein is applicable within any communications network regardless of the network topology implemented. As shown in FIG. 1, the example network fabric 100 may include a data center 102. In various embodiments, the data center 102 may include one or more servers or other computing resources. Although depicted as a single entity in FIG. 1, the data center 102 may comprise a plurality of geographically distributed servers configured to provide the core functionality for a network implementing the network fabric 100. In various embodiments, the data center 102 may provide cloud-based services to a number of end user devices 108.

The network fabric 100 may be configured to provide flows to and from the data center 102 and a plurality of end user devices 108-1 to 108-n (collectively, "the end user devices 108). The end user devices 108 may comprise one of a plurality of different computing devices, including but not limited to smart phones, laptops, desktops, smart watches, modems, Internet phones (facilitating Voice Over IP (VOIP)), printers, tablets, over the top (OTT) media devices (e.g., streaming boxes), among other devices. In various embodiments, the end user devices 108 may include one or more Internet of Things (IoT) devices, such as connected appliances (e.g., smart refrigerators, smart laundry machines, etc.), connected vehicles, connected thermostats, among others. A person of ordinary skill in the art would understand the end user devices 108 may cover any connected device that may download and/or upload data through the network fabric 100.

Data may flow between the end user devices 108 and the data center 102 through the distribution switches 104-1 to 104-n (collectively, "the distribution switches 108) and edge switches 106-1 to 106-n (collectively, "the edge switches 106") of the network fabric 100. The data center 102, distribution switches 104, and edge switches 106 represents different layers of a communications network to which each end user device 108 can connect and communicate. As a non-limiting example, the data center 102 may correspond to the core layer of a network implementing the network fabric 100, the distribution switches 104 may correspond to an intermediate layer of the network (e.g., a "fog" layer), and the edge switches 106 may correspond to an edge layer of the network, the edge corresponding to a geographic boundary of the network implementing the network fabric 100. The distribution switches 104 (also referred to as aggregation switches) represent one or more devices configured to uplink to the core layer and links down to the edge layer devices. The distribution switches 104 function to bridge the core layer and the edge layer, aggregating data flows from the edge switches 106 and forwarding the information to the core layer. In various embodiments, one or more distribution switches 104 may be directly connected to one or more servers of the data center 102, while in some embodiments one or more distribution switches 104 may be connected to a core layer switch, which is a high capacity switch positioned between the data center 102 or other devices of the core layer and the rest of the network fabric 100. In various embodiments, the distribution switches 104 can comprise a switch, hub, router, bridge, gateway, or other networking device configured to connect the core layer with the edge layer of the network fabric 100.

As discussed above, the edge switches 106 may be positioned at a geographic edge of the network fabric 100. Edge switches 106 (also referred to as access switches) provide a point of access for end user devices 108 to connect to the network, and are the only devices of the network fabric 100 that directly interact with the end user devices 108. In various embodiments, the edge switches 106 can comprise a switch, hub, router, bridge, gateway, or other networking device configured to connect the end user devices 108 with the network fabric 100 and to communicate with the distribution switches 104.

As discussed above, network traffic classification provides visibility for use in network monitoring, security enhancement, and priority treatment. Current classification approaches using statistical features is computationally intensive, and the edge switches 106 (and, in some cases, the distribution switches 104) lack the amount of computational resources necessary to perform classification based on large feature sets (e.g., the Bayesian approach discussed above). Therefore, the classification is generally conducted by core devices, such as the data center 102 shown in FIG. 1. However, in some instances the characteristics of a given flow at the edge switches 106 may differ from those of the marked class, or in some cases the flow may be marked as a default class. As a non-limiting example, in some instances each traffic flow may be marked with a QoS marking based on a host IP or the physical port through which the traffic is entering. This type of marking is easier to implement as all the traffic flows entering through the port is treated the same because marking is independent of the actual traffic class of entering flows, but it does not account for differences in the actual classes of flows. Due to these potential issues, continuous monitoring and classification of traffic flows at the edge switches 106 may help in effectively prioritizing flows within the network fabric 100. Unfortunately, the current statistical feature approaches with large feature sets, or those that rely on less-reliable features (e.g., time variant features), require more computational resources to provide highly accurate and reliable classifications than are generally available within edge switches 106.

As discussed above, the embodiments disclosed herein provides a classification feature set that is capable of highly accurate classification with minimal computational resources, resulting in a light-weight classification algorithm and classifier 110-1 to 110-n (collectively, "the classifier 110) that can be deployed onto the edge switches 106 such that classification can occur at the edge switches 106 without the need to transmit feature data to the data center 102 for classification. In various embodiments, the classifiers 110 can be implemented as a set of non-transitory machine-readable instructions stored on a memory of the edge switches 106 and executable by one or more processors or processing circuits of the edge switches 106. In some embodiments, the classifiers 110 may comprise dedicated processor(s) or processing circuitry within the edge switches 106, including but not limited to a co-processor, a core of a multi-core processor, or other processing circuits. As seen in FIG. 1, a flow 112 may be sent from the data center 102 to the end user device 108-2. As the flow 112 moves from the data center 102 to the distribution switch 104-1 and from the distribution switch 104-1 to the edge switch 106-1, it may be treated the same (e.g., marked as a default class, not classified at all, etc.). However, the classifier 110-1 may apply a classification model based on a packet length signature (discussed in greater detail with respect to FIGS. 2-6 below) and determine that the flow 112 belongs to a particular class of traffic. Accordingly, the classifier 110-1 can tag the flow 112 with an indication of the class, resulting in a classified flow 114 being sent from the edge switch 106-1 to the end user device 108-2.

Similar to prior art approaches, the technology disclosed herein utilizes statistical features representative of each flow, but determines the relevant features in a unique manner that reduces the overhead required to classify a flow. Specifically, embodiments of the technology disclosed herein introduces a novel and unique statistical based set of features to classify traffic into different classes based on their application layer properties, such as real-time flows, interactive flows, bulk flows, etc. The derived features are based on the packet-length pattern exhibited by the traffic classes for a given flow window, which is referred to in this disclosure as a packet length signature. Implementing the technology disclosed herein allows for classification to be based on the characteristics of the flows without the need to perform deep inspection of the data payloads or focusing on non-flow dependent metrics (e.g., marking passed on entering port). In this manner, encrypted flows can be classified in an efficient manner on the edge of a communications network without the need to perform resource-intensive inspection or communicating information with the cloud or other core networking devices.

Various embodiments disclosed herein enable classification on a fraction of the number of features of current approaches. For example, classification is possible based on a set of nine (9) features derived from the flow without the need for deep packet inspection or reliance on the source or destination port of the flow. In some embodiments, the nine features include several statistics based on packet length used in the art. As a non-limiting example, these known statistics include the number of unique packet lengths within the flow, the minimum packet length within the flow, the maximum packet length within the flow, the mean packet length within the flow, and the standard deviation of packet length within the flow.

In addition to the traditional packet length-based features known in the art, the nine features disclosed herein further includes statistics based on the run length of different packet lengths within the flow during a given window. The run length comprises the number of times a packet of a given length has repeated itself consecutively within the traffic flow. The inventors have identified that flows exhibit self-similarity, with packet length patterns exhibited by the flow across different sampling rates remaining more or less the same while also being unique across different classes of traffic. In other words, different classes of traffic have different packet length signatures that can be used to distinguish between different classes of flows. Utilizing this distinctive pattern of packet lengths, the technology disclosed herein is capable of sorting flows into a number of classes, including but not limited to audio streaming, video streaming, browsing, chat, peer-to-peer (P2P), file transfer protocol (FTP), and VOIP, without the need to rely on less reliable statistics (e.g., time variant types) required for current statistical approaches. Utilizing the run length, the minimum run length, maximum run length, mean run length, and standard deviation of run length can be calculated for the different unique packet lengths. The run lengths provides visibility to the packet length pattern present in the flow window (e.g., the sampling rate). In some embodiments, a sampling rate may be used to determine the statistics, while in other embodiments a fixed time window may be chosen within which to gather the required data and calculate the statistics. Nothing should be interpreted as limiting the scope of the technology to only the explicit features discussed below.

Figure 2:
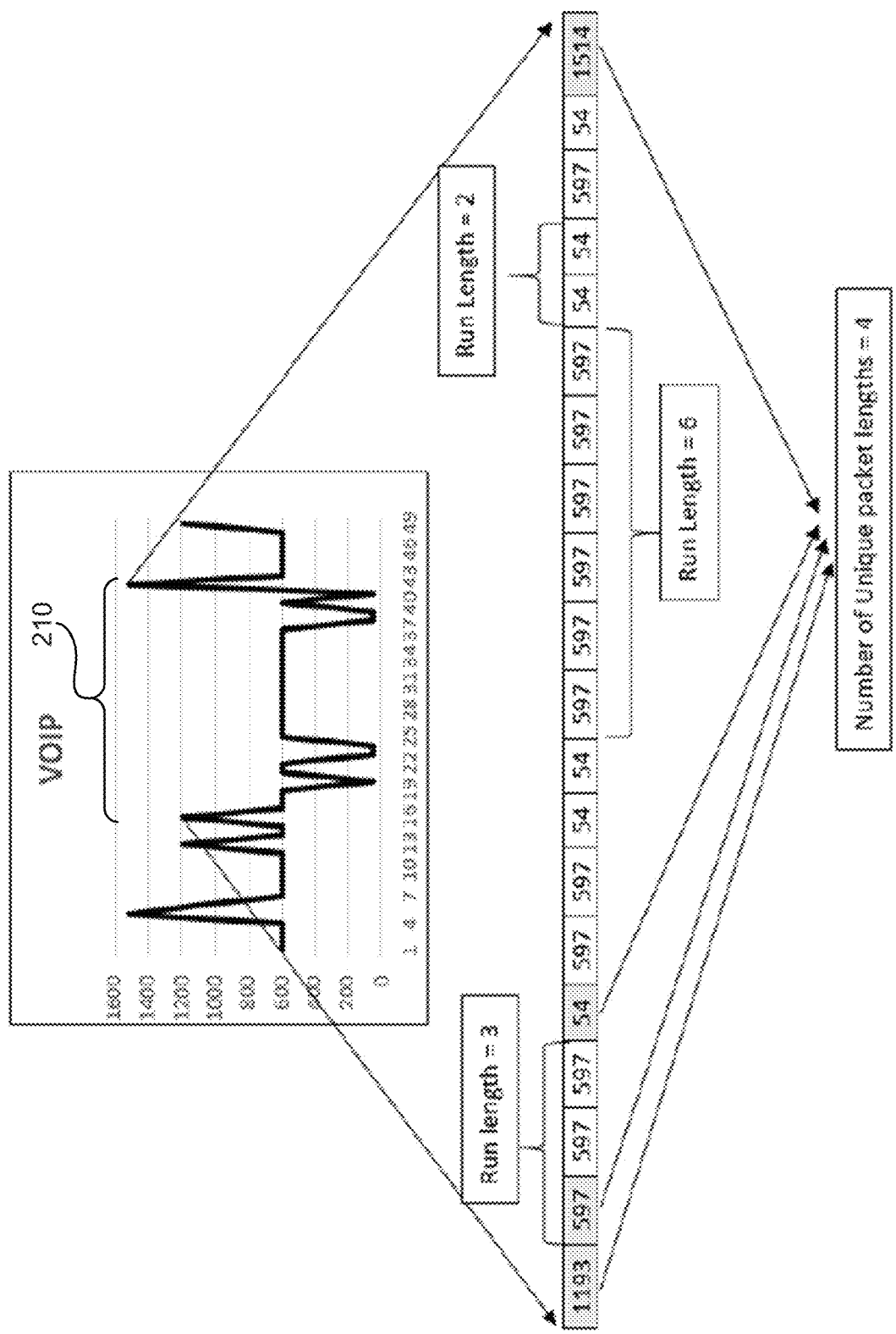
FIG. 2 is an example graph in accordance with embodiments of the technology disclosed herein.

FIG. 2 provides an example graph illustrating run lengths and unique packet lengths in accordance with embodiments of the technology disclosed herein. The data shown in the graph of FIG. 2 is based on the publicly available dataset from ISCXTor2016, published by the University of New Brunswick. Data associated with a VOIP flow within the dataset is shown in FIG. 2. The packet number within the VOIP flow is identified along the x-axis, while the length of each packet (in bytes) is identified along the y-axis. A sample 210 of the VOIP flow is excerpted, showing the data packets within the sample 210. As shown in FIG. 2, a total of four (4) unique packet lengths are present within the sample 210: packet length 1193, packet length 597, packet length 54, and packet length 1514. The packet length-based statistics are generated based on these four unique packet lengths. In addition, as can be seen, run lengths can be identified within the sample 210. For example, packet length 597 exhibits a run length of three (3) near the start of the sample 210 and a run length of six (6) later in the sample 210, while the packet length 54 exhibits a run length of two (2) just after the six-length run for packet length 597.

Table 1 below identifies the packet length and run length statistics discussed above for various different traffic classes of flows. The data is based on the same dataset used for the graph illustrated in FIG. 2. Table 1 provides values for the nine identified features for one example flow of each type of traffic class: audio, browsing, FTP, P2P, video, and VOIP. The values shown are calculated over a sample of 75 packets for each selected flow.

TABLE 1

| Statistical Feature Values for Different Classes | | | | | | | | |
|---|---|---|---|---|---|---|---|---|
| Unique Packet | Packet Length Statistics | | | | Run Length Statistics | | | Traffic Class |
| Lengths | Mean | Stdv | Min | Max | Mean | Stdv | Min | Max | Type |
| 9 | 1250.16 | 419.49 | 60 | 1474 | 1.19 | 0.50 | 1 | 3 | Audio |
| 14 | 741.73 | 639.48 | 60 | 1474 | 1.43 | 1.08 | 1 | 7 | Browsing |
| 3 | 152.52 | 314.51 | 60 | 1392 | 4.75 | 5.58 | 1 | 22 | FTP |
| 7 | 278.31 | 419.91 | 54 | 1514 | 2.03 | 1.91 | 1 | 8 | P2P |
| 11 | 1269.81 | 405.58 | 60 | 1474 | 1.34 | 0.90 | 1 | 5 | Video |
| 5 | 225.11 | 403.79 | 60 | 1392 | 3.26 | 3.49 | 1 | 11 | VOIP |

Utilizing the feature set identified above in Table 1 to build a decision tree classifier, offline testing (e.g., training) has shown an average accuracy of 91% with 10 fold cross validation. Moreover, when an online testing model was deployed in an example edge device, such as an edge switch 106 discussed with respect to FIG. 1, the model shows an average accuracy of 85% in classifying the traffic when it was running for several hours by a classifier operating on the edge device, such as the classifier 110 discussed with respect to FIG. 1. This illustrates that the run length features enable a high accuracy of classification without the need for a large feature set and without relying on less reliable features (e.g., the time variant types).

In addition to accuracy measures, the effect the choice of features has on the decision the classifier makes also illustrates the benefits of including the run length-based features in the model. As seen in Table 1, the packet length statistics contain some overlap between the different classes of traffic. For example, the classes representing audio, browsing, and video each have the same feature value for the minimum packet length and maximum packet length. Therefore, using the packet length statistics alone in a classifier algorithm results in a larger number of generated rules in order for the model to classify the traffic flows accurately compared with a classifier utilizing both the identified packet length statistics features and the run length statistics features. Obtaining the run length-based features does not add excessive overhead to the classification model because the run length-based features is extracted based on the same packet length information contained within the IP header of the packet used in determining the packet length-based features.

Figure 3:
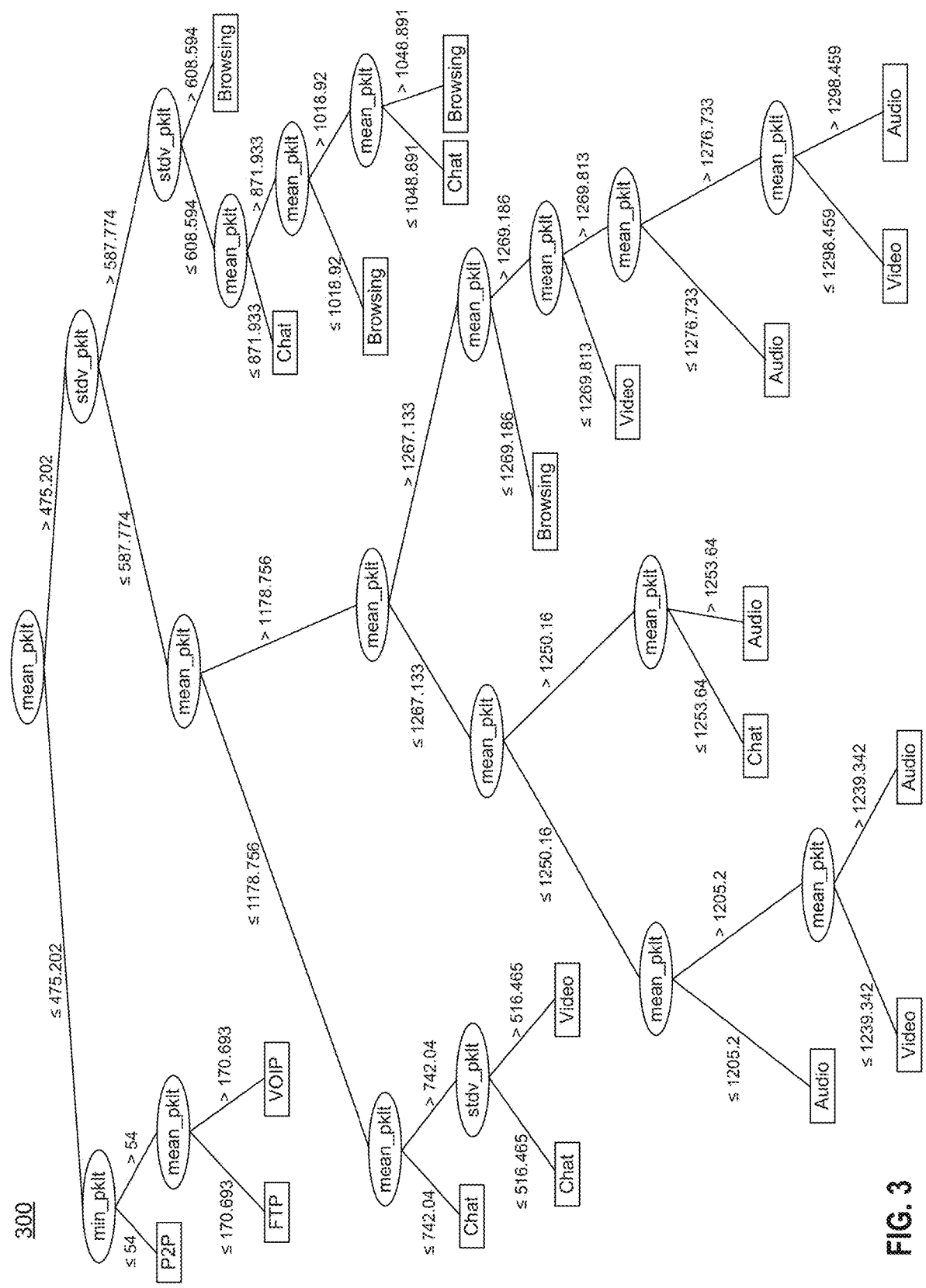
FIG. 3 is an example decision tree classifier in accordance with embodiments of the technology disclosed herein.
Figure 4:
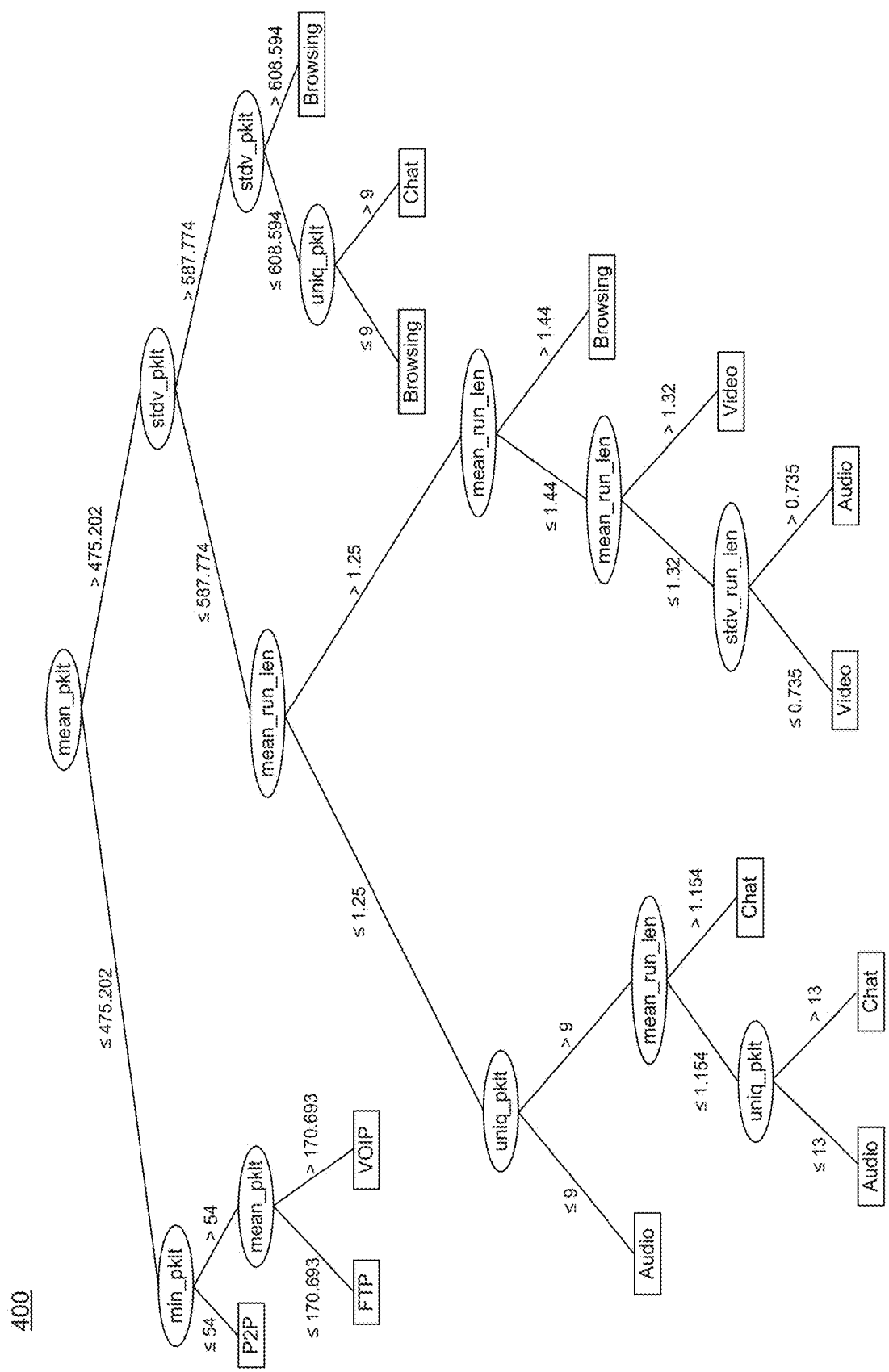
FIG. 4 is another example decision tree classifier in accordance with embodiments of the technology disclosed herein.

FIGS. 3 and 4 depict example decision tree classifiers 300 and 400, respectively, in accordance with embodiments of the technology disclosed herein. The decision tree classifier 300 depicted in FIG. 3 is generated based on the packet length-based features only, while the decision tree classifier 400 depicted in FIG. 4 is generated based on the packet length-based features, unique packet length value, and the run length-based features disclosed in the present disclosure. During a training phase, values for each statistical feature are calculated for a number of different flows for each traffic class, with the values for each flow within the traffic class aggregated to determine an aggregate value for each relevant feature for each traffic class. For example, the decision tree classifier 300 can utilize aggregate values for the packet length-based statistics only, while the decision tree classifier 400 can utilize aggregate values for all nine of the identified features discussed above with respect to FIGS. 2-4 and Table 1.

As can be seen when compared, the decision tree classifier 400 results in a less complex algorithm to classify all of the traffic flows, with less rules being generated in total for all of the types of classes, than decision tree classifier 300. For example, the decision tree classifier 300 results in five rules being generated and required to classify a flow as audio or chat, four rules to classify a flow as browsing or video, and one rule to classify a flow as FTP, P2P, or VOIP, for a total of 21 rules. When run length-based features are included, however, a total of only 13 rules are required to classify all of the flows into one of the seven types: two for audio and video, four for chat, three for browsing, and one for FTP, P2P, and VOIP. The reduction in the total number of generated rules results in a more light-weight classification model, using less computational resources to accurately classify the traffic flows in the network. In various embodiments, the decision tree classifiers 300 and 400 may be deployed on the edge switches 106 as the classifiers 110. In various embodiments, the classifiers 110 can be configured to apply the rules generated by the decision tree classifiers 300 or 400 to the received traffic flows to determine the associated traffic class.

Because of the lower computational requirements based on the identified feature set (including packet length-based and run length-based statistical features), and extracting the features is easier compared to more in depth and less reliable features (e.g., inter-packet arrival time, etc.), embodiments of the present disclosure can be implemented in the edge switches 106 themselves, rather than requiring additional compute resources to be allocated to the device making the classification. This facilitates high scalability, even when deployed on devices like edge switches 106 discussed with respect to FIG. 1. As deployed on the edge switches 106, the model can be used for network monitoring, and also to tag traffic flows with specific class designations for providing dynamic policing options. This can also be used to mark the traffic with the proper QoS values and be useful in detecting the deviation in the marked class based on the exhibited characteristics, thereby allowing for real-time reclassification on the edge without the need to send information back to the core, or cloud, servers. Moreover, although discussed specifically with respect to classifying flow traffic within a network fabric, the technology disclosed herein is applicable to any real-world data that exhibits a unique sequence.

Although the technology disclosed herein is capable of being deployed on edge networking devices, such as the edge switches 106 discussed above with respect to FIG. 1, a person of ordinary skill in the art would appreciate that embodiments of the technology could be deployed closer to or in the core of the network. As a non-limiting example, various embodiments of the technology disclosed herein can be deployed at intermediate layers of the network, such as the distribution switches 104 of the network fabric 100 discussed above with respect to FIG. 1. As another non-limiting example, various embodiments of the technology can be deployed in the core, such as at the data center 102, to enable real-time classification to occur at the core (e.g., in the cloud) without the need for communication from the network devices (e.g., the edge switches 106, the distribution switches 108) in order to perform classification. Moreover, by deploying the light-weight model in accordance with the technology disclosed herein in the data center 102 (e.g., the cloud), real-time classification is possible in a more computationally efficient manner, freeing up resources for use by other applications.

Figure 5:
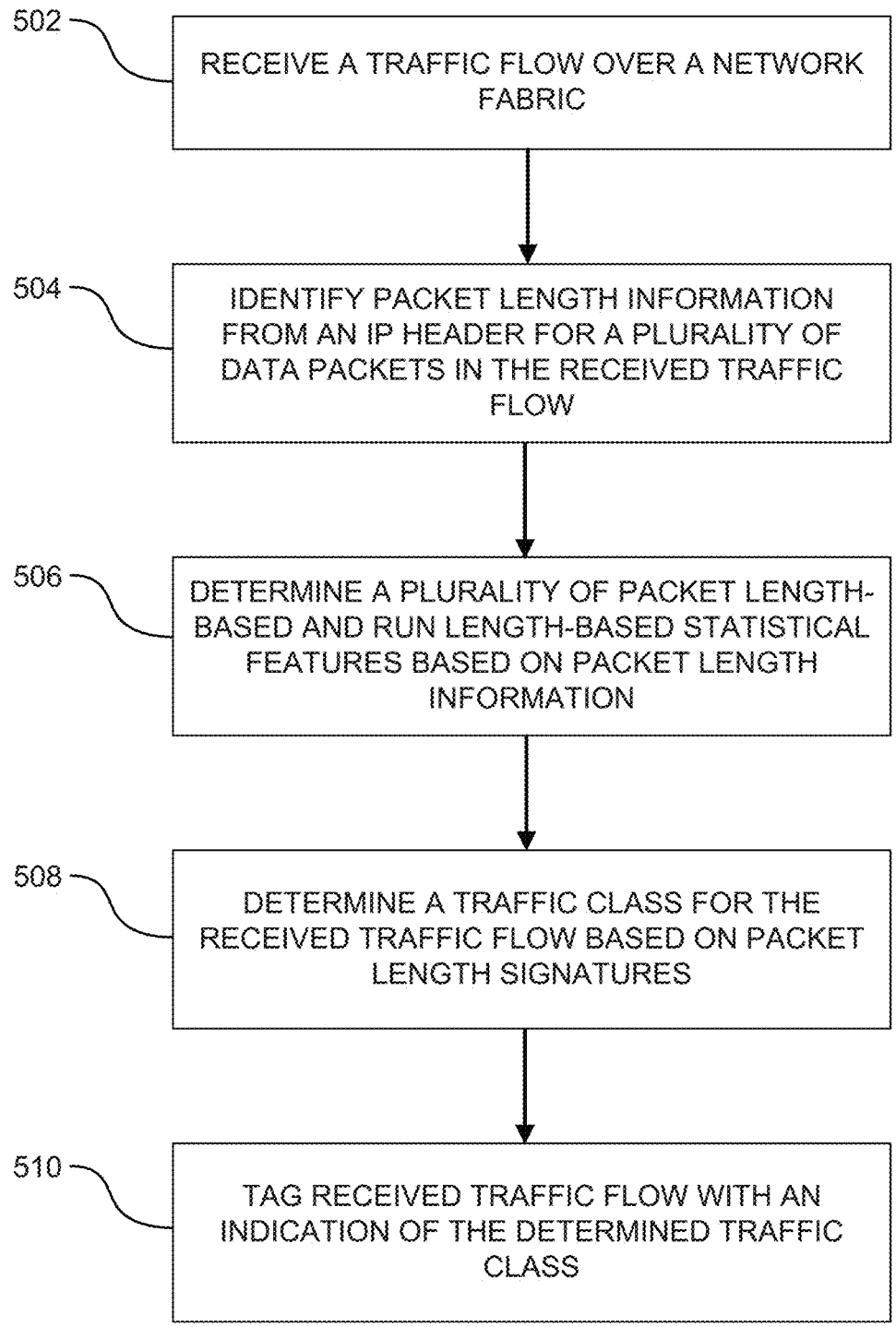
FIG. 5 is an example method in accordance with embodiments of the technology disclosed herein.

FIG. 5 illustrates an example method 500 in accordance with embodiments of the technology disclosed herein. Method 500 is provided for illustrative purposes only and should not be interpreted as limiting the scope of the technology to only the depicted operations. In various embodiments, the method 500 may be performed by an edge networking device, such as the edge switches 106 discussed with respect to FIG. 1. In some embodiments, the method 500 may be implemented by one or more networking devices at an intermediate layer of a network fabric, such as the distributions switches 104 discussed with respect to FIG. 1.

At operation 502, a traffic flow is received over a network fabric by an edge switch. Each edge switch may receive a plurality of different flows during operation, and the method 500 may be applied to each of the plurality of traffic flows received by the edge switch. At operation 504, the edge switch can identify packet length information from an IP header for a plurality of data packets in the received traffic flow. In various embodiments, the plurality of data packets may comprise all of the data packets for the received traffic flow, while in other embodiments the method 500 may be performed over one or more samples of the receive traffic flow. In some embodiments, the samples may be determined based on a sampling rate of a number of data packets of the receive traffic flow. The sampling may be determined based on a set time window in other embodiments. All of the data needed for method 500 is identified from the packet length information extracted from the IP header for each of the data packets of the plurality of data packets, without the need for performing any inspection of the data packet payload.

At operation 506, a plurality of packet length-based and run length-based statistical features are determined based on the identified packet length information. A feature set is generated including the nine features identified and discussed above with respect to FIGS. 2-4. In other embodiments, one or more additional features may be derived from the packet length information identified at operation 504. In various embodiments, the features included in the feature set determined at operation 506 may be identified during a training period prior to deployment of the model to the edge switch.

At operation 508, the edge switch determines a traffic class for the received traffic flow based on packet length signatures. As discussed above, each different traffic class has a different and unique packet length pattern (i.e., packet length signature). In various embodiments, the packet length signatures can be identified during a training period prior to deployment on the edge switch. A decision tree classifier can be used to generate one or more rules associated with each traffic class being transmitted over the network fabric. In various embodiments, the decision tress classifier could generate the rules in a manner similar to that discussed above with respect to FIG. 4. In some embodiments, determining the traffic class may comprise comparing the determined plurality of packet length-based and run length-based statistical features of operation 506 against known calculated feature values for the different traffic classes. In other embodiments, determining the traffic class can comprise apply one or more rules generated by a decision tree classifier during a training period prior to deployment to the edge switch.

At operation 510, the received traffic flow can be tagged with an indication of the determined traffic class. In various embodiments, tagging the received traffic flow can comprise generating metadata indicating the traffic class for the traffic flow and transmitting the metadata along with the traffic flow. In various embodiments, operation 510 may further include tagging the received traffic flow with one or more additional indications, including but not limited to marking the traffic flow with a particular QoS value for the class. In some embodiments, the tag may be added to the IP header of each data packet of the received traffic flow.

Figure 6:
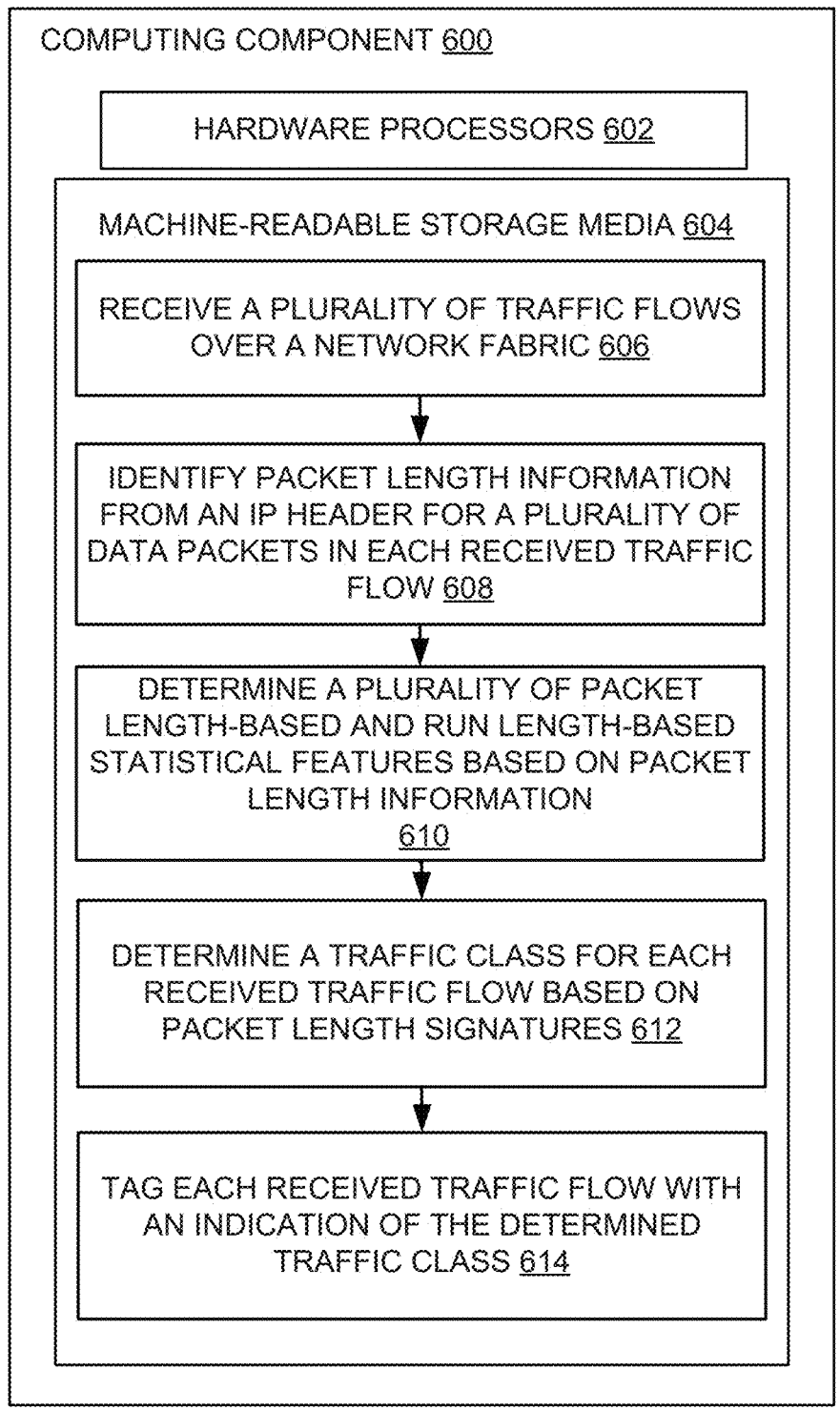
FIG. 6 is an example computing device in accordance with embodiments of the technology disclosed herein.

FIG. 6 illustrates an example computing device 600 in accordance with embodiments of the present disclosure. Where operations and functionality of computing device 600 are similar to those discussed with respect to FIGS. 1-5, the description should be interpreted to apply. Computing device 600 includes hardware processors 602. In various embodiments, hardware processors 602 may include one or more processors. In various embodiments, computing device 600 may comprise the data center 102, the edge switches 106, and/or the distribution switches 104 discussed with respect to FIG. 1.

Hardware processors 602 are configured to execute instructions stored on a machine-readable medium 604. Machine-readable medium 604 may be one or more types of non-transitory computer storage mediums. Non-limiting examples include: flash memory; solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 604 may include various sub-instructions for performing the function embodied by the identified functions. For example, the instruction "receive a plurality of traffic flows over a network fabric" 606 may include various sub-instructions for receiving, by an edge switch, a plurality of traffic flows between one or more end user devices and the network in a manner discussed with respect to FIGS. 1-5 above. In various embodiments, the sub-instructions may further include sorting the plurality of received traffic flows such that each traffic flow is identifiable by the edge switch.

The instruction "identify packet length information from an IP header for a plurality of data packets in each received traffic flow" 608 may include various sub-instructions for identifying packet length information associated with the received traffic flows in a manner discussed above with respect to FIGS. 1-5. In various embodiments, the sub-instructions may further include decoding one or more compression or encoding methods applied to the received traffic flow to gain access to the IP header for each data packet within each received traffic flow. The sub-instructions may further include extracting the packet length information from each IP header and storing the information on the machine-readable storage medium 604. In various embodiments, the plurality of data packets may comprise all of the data packets of each received traffic flow, while in other embodiments the sub-instructions may further include instructions for determining a sample of data packets of each received traffic flow, based on a sampling rate or a timed window, such as the sampling discussed with respect to FIGS. 2-5 and Table 1 above.

The instruction "determine a plurality of packet length-based and run length-based statistical features based on packet length information" 610 may include various sub-instructions for calculating values for a plurality of different statistical features in a manner similar to that discussed above with respect to FIGS. 1-5. In various embodiments, determining a the feature set can comprise the nine features identified and discussed above with respect to FIGS. 2-4 and Table 1. The packet length-based and run length-based features can be derived from the packet length information extracted from the IP header associated with each data packet of the plurality of data packets. The statistical features may be derived over the run length of each unique packet length based on the packet length information.

The instruction "determine a traffic class for each received traffic flow based on packet length signatures" 612 may include various sub-instructions for comparing the determined feature values against known values associated with different traffic classes in a manner similar to that discussed above with respect to FIGS. 1-5 and Table 1. In various embodiments, the sub-instructions may include instructions to apply one or more rules to the determined feature values to identify the traffic class associated with each received traffic flow. In other embodiments, the sub-instructions may include instructions to compare the determined feature values to known values associated with a given traffic class, wherein the known values may be maintained in the machine-readable storage medium 604 or another non-transitory machine-readable storage media of the computing device 600. The instruction "tag each received traffic flow with an indication of the determined traffic class" 614 may include sub-instructions for tagging each traffic flow in a manner similar to that discussed above with respect to FIGS. 1-5. The sub-instructions may include instructions for associating metadata to the traffic flow to identify the determined traffic class in various embodiments.

Figure 7:
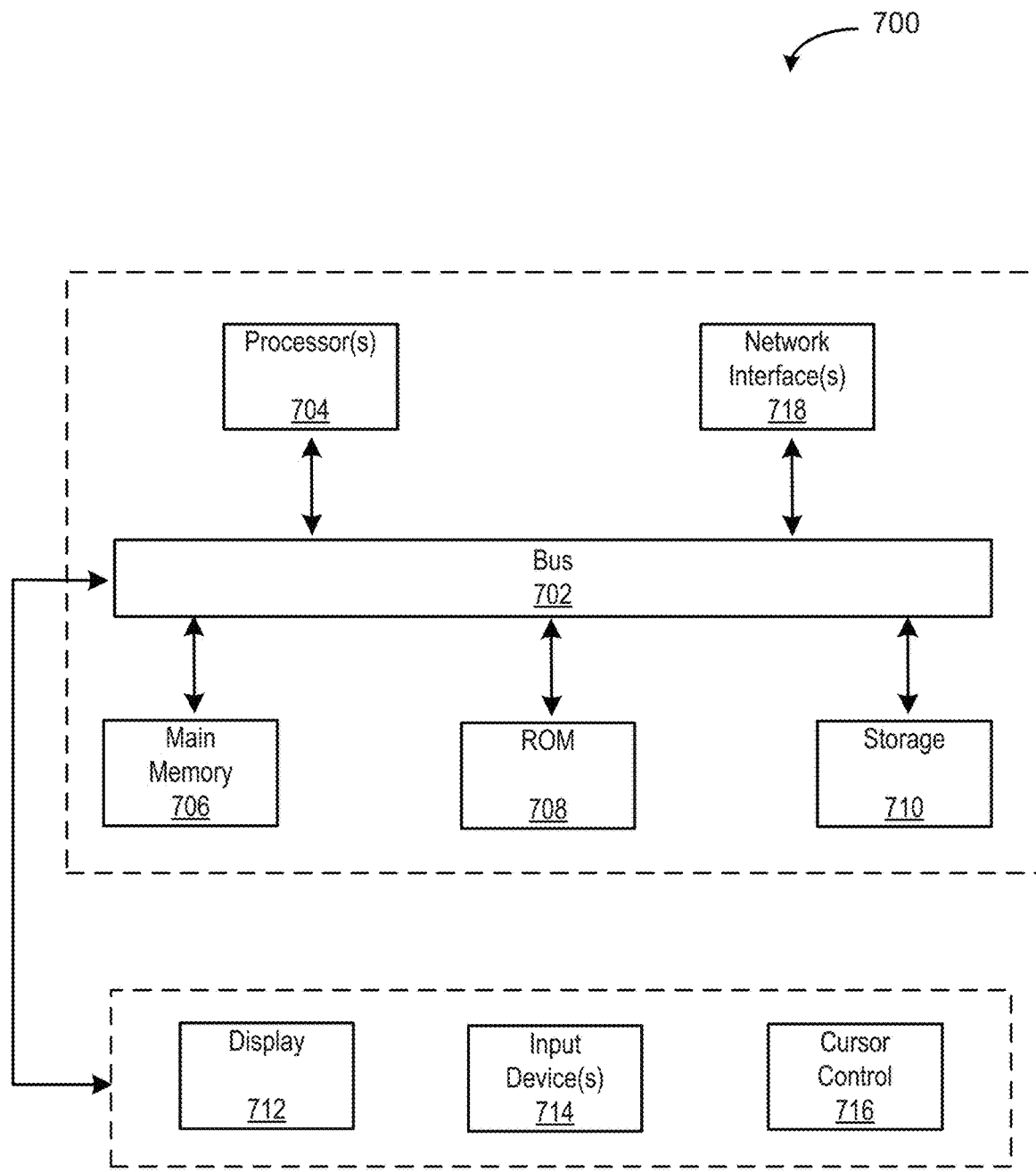
FIG. 7 is an example computing component that may be used to implement various features of embodiments described in the present disclosure.

FIG. 7 depicts a block diagram of an example computer system 700 in which various embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An edge switch comprising:
   a processor;
   a memory communicatively coupled to the processor and storing non-transitory machine-readable instructions that when executed by the processor cause the processor to:
   receive a traffic flow over a network fabric;
   identify packet length information from an Internet protocol (IP) header for a plurality of data packets in the received traffic flow;
   determine a plurality of packet length-based and run length-based statistical features based on the identified packet length information;
   determine a traffic class for the received traffic flow based on the determined packet length-based and run length-based statistical features; and
   tag the received traffic flow with an indication of the determined traffic class,
   wherein each traffic class of a plurality of traffic classes has a unique packet length pattern defined by an aggregated set of packet length-based and run length-based statistical features determined during a training phase, and
   wherein the edge switch is disposed on a geographic boundary of the network fabric.

2. The edge switch of claim 1, wherein a run length comprises a number of times a data packet having a respective packet length within the received traffic flow repeats consecutively within the received traffic flow.

3. The edge switch of claim 1, wherein the packet length-based statistical features comprises a number of unique packet lengths, a maximum packet length, a minimum packet length, a mean packet length, and a standard deviation of the packet length, and wherein the run length-based statistical features comprises a maximum run length, a minimum run length, a mean run length, and a standard deviation of run length.

4. The edge switch of claim 1, wherein the edge switch is an access switch for a network fabric and is communicatively coupled to a plurality of end user devices.

5. The edge switch of claim 1, wherein the plurality of data packets comprises a sample of data packets within the received traffic flow.

6. The edge switch of claim 5, wherein the sample of data packets is determined based on a sampling rate.

7. The edge switch of claim 5, wherein the sample of data packets is determined based on a time window.

8. The edge switch of claim 1, wherein the plurality of data packets comprises all data packets within the received traffic flow.

9. The edge switch of claim 1, wherein tagging the received traffic flow comprises associating metadata identifying the determined traffic class with the received traffic flow.

10. The edge switch of claim 1, wherein tagging the received traffic flow comprises adding an indication to the IP header of each of the plurality of data packets.

11. A method comprising:
    receiving, by a network fabric device, a traffic flow over a network fabric;

identifying, by the network fabric device, packet length information from an Internet protocol (IP) header for a plurality of data packets in the received traffic flow;

determining, by the network fabric device, a plurality of packet length-based and run length-based statistical features based on the identified packet length information;

determining, by the network fabric device, a traffic class for the received traffic flow based on the determined packet length-based and run length-based statistical features; and tagging, by the network fabric device, the received traffic flow with an indication of the determined traffic class, wherein each traffic class of a plurality of traffic classes has a unique packet length pattern defined by an aggregated set of packet length-based and run length-based statistical features determined during a training phase.

12. The method of claim 11, wherein a run length comprises a number of times a data packet having a respective packet length within the received traffic flow repeats consecutively within the received traffic flow.

13. The method of claim 11, wherein the packet length-based statistical features comprises a number of unique packet lengths, a maximum packet length, a minimum packet length, a mean packet length, and a standard deviation of the packet length, and wherein the run length-based statistical features comprises a maximum run length, a minimum run length, a mean run length, and a standard deviation of run length.

14. The method of claim 11, wherein the plurality of data packets comprises a sample of data packets within the received traffic flow.

15. The method of claim 14, wherein the sample of data packets is determined based on a sampling rate.

16. The method of claim 14, wherein the sample of data packets is determined based on a time window.

17. The method of claim 11, wherein the plurality of data packets comprises all data packets within the received traffic flow.

18. The method of claim 11, wherein tagging the received traffic flow comprises associating metadata identifying the determined traffic class with the received traffic flow.

19. The method of claim 11, wherein tagging the received traffic flow comprises adding an indication to the IP header of each of the plurality of data packets.

20. A networking device comprising:
a processor;
a memory communicatively coupled to the processor and storing non-transitory machine-readable instructions that when executed by the processor cause the processor to:
receive a traffic flow over a network fabric;
identify packet length information from an Internet protocol (IP) header for a plurality of data packets in the received traffic flow;
determine a plurality of packet length-based and run length-based statistical features based on the identified packet length information;
determine a traffic class for the received traffic flow based on the determined packet length-based and run length-based statistical features; and
tag the received traffic flow with an indication of the determined traffic class,
wherein each traffic class of a plurality of traffic classes has a unique packet length pattern defined by an aggregated set of packet length-based and run length-based statistical features determined during a training phase, and
wherein the networking device is configured to perform traffic classification for a plurality of received traffic flows in real-time.

\* \* \* \* \*